US010983016B2

(12) United States Patent
Guezelocak (10) Patent No.: US 10,983,016 B2
(45) Date of Patent: Apr. 20, 2021

(54) MONITORING SYSTEM FOR MOTOR VEHICLES

(71) Applicant: Denis Guezelocak, Munich (DE)

(72) Inventor: Denis Guezelocak, Munich (DE)

( * ) Notice: Subject to any disclaimer, the term of this patent is extended or adjusted under 35 U.S.C. 154(b) by 0 days.

(21) Appl. No.: 14/712,206

(22) Filed: May 14, 2015

(65) Prior Publication Data

US 2016/0061669 A1 Mar. 3, 2016

(30) Foreign Application Priority Data

May 15, 2014 (DE) .......................... 102014007163.4

(51) Int. Cl.
*G01L 1/20* (2006.01)
*B62D 1/04* (2006.01)
(Continued)

(52) U.S. Cl.
CPC ................ *G01L 1/20* (2013.01); *B62D 1/046* (2013.01); *B62D 1/065* (2013.01); *B60K 28/06* (2013.01); *B60K 37/06* (2013.01); *B60K 2370/782* (2019.05); *G01L 1/22* (2013.01); *G01L 5/221* (2013.01)

(58) Field of Classification Search
CPC ............. B60K 2350/928; B60K 28/06; B60K 28/063; B60K 28/066; B60K 37/06; B62D 1/046; B62D 1/06; B62D 1/065; B62D 15/029; G01L 1/146; G01L 1/16; G01L 1/20; G08B 21/06
USPC ................................. 180/271, 272; 219/204; 340/426.24–426.25, 426.31, 438–439; 340/575–576; 701/41; 74/558
See application file for complete search history.

(56) References Cited

U.S. PATENT DOCUMENTS 3,585,626 A * 6/1971 Tartarini ................ B60Q 5/003
180/272
4,540,979 A * 9/1985 Gerger ................. B60K 28/066
180/272
(Continued)

FOREIGN PATENT DOCUMENTS

DE 19539482 A1 6/1996
DE 19631502 C1 1/1998
(Continued)

*Primary Examiner* — Jonathan M Dunlap
(74) *Attorney, Agent, or Firm* — Barnes & Thornburg LLP (57) ABSTRACT

A monitoring system for motor vehicles has a number of sensors, which are arranged on control and/or actuation devices of the motor vehicle, which have a core and an outer envelope covering the same to some extent. The sensors are embedded between the core and the outer envelope thereof and deliver an output signal when a force is exerted onto the outer envelope. The sensors are formed by a sensor unit, which can be stretched or clamped onto the core, with a first foil with a first conducting trace pattern and with a second foil, arranged thereabove, with a second conducting trace pattern. The conducting trace patterns are arranged on mutually facing surfaces of the two foils and the mutually facing surfaces of the foil are connected to one another via spacer elements in such a manner that the foils are elastically biased away from one another and a contact between the first and second conducting trace patterns can be produced by exerting a force onto at least one of the foils.

10 Claims, 5 Drawing Sheets

(51) Int. Cl.
  *B62D 1/06* (2006.01)
  *G01L 5/22* (2006.01)
  *B60K 28/06* (2006.01)
  *B60K 37/06* (2006.01)
  *G01L 1/22* (2006.01)

(56) References Cited

U.S. PATENT DOCUMENTS

| | | | | |
|---|---|---|---|---|
| 4,547,655 A * | 10/1985 | Kurata | ............... | B62D 1/065 219/204 |
| 4,617,559 A * | 10/1986 | Slansky | ............... | G08B 21/06 340/575 |
| 4,631,976 A * | 12/1986 | Noda | ............... | B62D 1/065 219/204 |
| 5,453,929 A * | 9/1995 | Stove | ............... | A61B 5/18 340/571 |
| 5,743,154 A * | 4/1998 | Jacinth | ............... | B62D 1/06 74/558 |
| 5,969,616 A * | 10/1999 | Tschoi | ............... | B60K 28/066 180/272 |
| 6,114,668 A * | 9/2000 | Ogata | ............... | B62J 33/00 219/202 |
| 6,505,521 B1 * | 1/2003 | Petri | ............... | G01L 1/20 73/862.042 |
| 6,768,962 B2 * | 7/2004 | Bullinger | ............... | B62D 1/046 701/41 |
| 6,871,720 B2 * | 3/2005 | Hauer | ............... | B62D 1/06 180/315 |
| 7,019,623 B2 * | 3/2006 | Klausner | ............... | B62D 15/029 340/425.5 |
| 7,321,311 B2 * | 1/2008 | Rieth | ............... | B62D 1/046 180/271 |
| 7,649,278 B2 * | 1/2010 | Yoshida | ............... | B60K 37/06 307/9.1 |
| 7,954,399 B2 * | 6/2011 | Rubboli | ............... | B62D 1/046 200/61.57 |
| 8,063,886 B2 * | 11/2011 | Serban | ............... | G06F 3/0416 345/173 |
| 8,099,215 B2 * | 1/2012 | Kuramori | ............... | B62D 1/046 701/34.4 |
| 8,115,648 B2 * | 2/2012 | Lorenz | ............... | B60R 21/01532 180/271 |
| 8,547,215 B2 * | 10/2013 | Sanma | ............... | B62D 1/046 340/438 |
| 8,564,424 B2 * | 10/2013 | Evarts | ............... | B60Q 9/00 340/426.24 |
| 2008/0202251 A1 * | 8/2008 | Serban | ............... | G01L 1/142 73/780 |
| 2010/0107770 A1 * | 5/2010 | Serban | ............... | G01L 1/142 73/718 |
| 2011/0115617 A1 * | 5/2011 | Bennett | ............... | B60Q 1/50 340/439 |
| 2011/0241850 A1 * | 10/2011 | Bosch | ............... | H03K 17/9625 340/384.6 |
| 2013/0062329 A1 * | 3/2013 | Morita | ............... | H05B 3/34 219/204 |
| 2014/0224040 A1 * | 8/2014 | Van'tZelfde | ............... | G01L 1/00 73/862.381 |
| 2014/0339211 A1 * | 11/2014 | Barfuss | ............... | B62D 1/065 219/202 |
| 2015/0032334 A1 * | 1/2015 | Jang | ............... | B62D 1/046 701/42 |
| 2016/0009310 A1 * | 1/2016 | Seki | ............... | H05B 3/34 219/204 |

FOREIGN PATENT DOCUMENTS

| | | | |
|---|---|---|---|
| DE | 10048956 C1 | 5/2002 | |
| DE | 102006023287 A1 | 6/2007 | |
| DE | 102010035940 A1 * | 3/2012 | ............ B60K 28/06 |
| DE | 102010035940 B4 | 4/2012 | |

\* cited by examiner

MONITORING SYSTEM FOR MOTOR VEHICLES

BACKGROUND OF THE INVENTION

The invention relates to a monitoring system for motor vehicles, comprising a number of sensors arranged on control and/or actuation devices of the motor vehicle; evaluation means for evaluating the output signals of the sensors; and signalling means, which deliver control signals to signalling means and/or operating means of the vehicle, wherein the control and/or actuation devices have a core and an outer envelope covering the core at least to some extent, and wherein sensor elements are embedded between the core and the outer envelope thereof and are distributed over a substantial portion of an outer surface of the actuation apparatuses and deliver an output signal when a force is exerted onto the outer envelope, A monitoring and emergency system of this type is known from DE 10 2010 035 940 B4, wherein flat conductor elements with contact projections are provided on the control and/or actuation means, which projections engage into openings of an elastic layer lying between the conductor elements and, when pressure is exerted, come into electrical contact with one another, in order to generate an output signal, which indicates the contact of at least a few of the contact projections with one another, if a force is exerted onto the control and/or means and/or actuation devices of the motor vehicle, for example in the case of the holding and moving of a steering wheel and/or gear-change lever or the like.

SUMMARY OF THE INVENTION

The invention is based on the object of creating a monitoring system of the type mentioned above, which results in extended evaluation options with simpler construction and simpler assembly at the respective control and/or actuation means.

This object is achieved by a monitoring as set out above, wherein the sensor elements are formed by a pre-assembled sensor unit adapted to be stretched onto the core of the control and/or actuation device and covered by the outer envelope. The sensor unit comprises a first electrically-insulating foil having a first electrically conducting trace pattern, and a second electrically-insulating foil having a second electrically conducting trace pattern arranged above said first foil, wherein the conducting trace patterns are arranged on the mutually facing surfaces of the first and second foils. The mutually facing surfaces of the first and/or second foil (31, 32) are connected to one another by means of spacer elements arranged between the foils. The foils are elastically biased away from one another and a contact between the first and second conducting trace patterns (33, 34) can be produced by exerting a force onto at least one of the foils. At least one of the first and second conducting trace patterns is divided into a plurality of individual areas, and first groups of individual areas are connected to one another via connecting conducting traces and to the evaluation means by means of conducting bus traces.

The connecting conducting traces and/or the bus traces preferably have a measurable resistance.

According to one embodiment of the invention, the spacer elements are elastically deformable.

According to a further embodiment, the first and/or second foil is elastically deformable in the region between the spacer elements, in addition to or as an alternative to elastically deformable spacer elements.

One of the first and second conducting trace patterns may be formed by a large-area conducting surface covering a substantial part of the foil.

The sensor unit may have a central web, and tabs that are spaced from one another by intermediate spaces extend from both longitudinal sides of the central web.

In the case of a multidimensionally curved surface of the core, the central web of the sensor unit may have a shape which follows the shape of one of the lines of curvature of the surface, and the tabs are adapted to be stretched onto the surface in the direction of a second line of curvature, which is oriented substantially orthogonally to the first line of curvature at the point of connection with the central web.

The core may be the outer rim of a steering wheel, wherein the first line of curvature corresponds to the front edge of the outer rim and the second line of curvature corresponds to the outer circumference of the cross-section of the outer rim.

In a further embodiment for a multidimensionally curved surface of the core, the central web of the sensor unit is rectilinear and can be laid on the outer circumference of the curved surface of the core, which is curved along a first line of curvature, and in the tabs are adapted to be stretched onto the surface in the direction of a second line of curvature, which is in each case essentially at right angles to the first line of curvature at the point of connection with the central web.

The core may be for instance the outer rim of a steering wheel, wherein the first line of curvature corresponds to the outer circumference of the outer rim and the second line of curvature corresponds to the outer circumference of the cross-section of the outer rim.

One of the conducting trace patterns may be adapted to be connected to a voltage source, whilst the other of the conducting trace patterns may be connected via the conducting bus traces to one or a plurality of inputs of a microprocessor forming part of the evaluation means, which is adapted for measuring the current flowing between the two conducting trace patterns and/or the resistance between these two conducting trace patterns.

The current or resistance measurement may be continuously repeated in short time periods and the microprocessor may be adapted to determine a zero state from the respective measured values, wherein deviations from this zero state above a predetermined threshold constitute a trigger criterion for an alarm state.

One of the foils may carry a further conducting trace, which is constructed for heating the steering wheel.

It is possible by means of the configuration of the monitoring system according to the invention, to construct the individual sensor elements in the form of a one-piece sensor unit, which can be stretched onto the core of the control and/or actuation devices and can be covered by an outer envelope.

The individual conducting trace patterns on the foils, can be divided into groups, wherein the conducting traces and/or bus traces are preferably arranged in groups, which form separate groups, which are adapted be evaluated separately by the evaluation means.

According to a preferred configuration of the invention, the connecting conducting traces and/or bus traces are produced from a material, which produces a measurable resistance over the length of the traces, so that a determination of the position of an actuation or force exertion and/or a change of this actuation can be evaluated very simply by means of a microprocessor as a function of the position and actuation of individual sensors of the sensor unit.

BRIEF DESCRIPTION OF THE DRAWING FIGURES

The invention will be explained in more detail hereinafter on the basis of exemplary embodiments that are illustrated in the drawing.

In the drawing.

DESCRIPTION OF THE INVENTION

Figure 1:
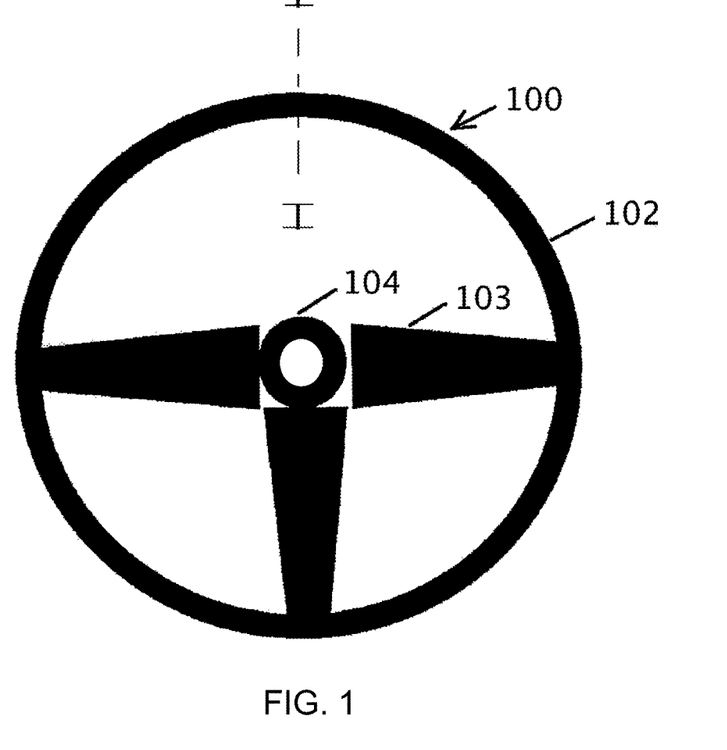
FIG. 1 shows a schematic illustration of a steering wheel, which constitutes an example for an actuation device.
Figure 1A:
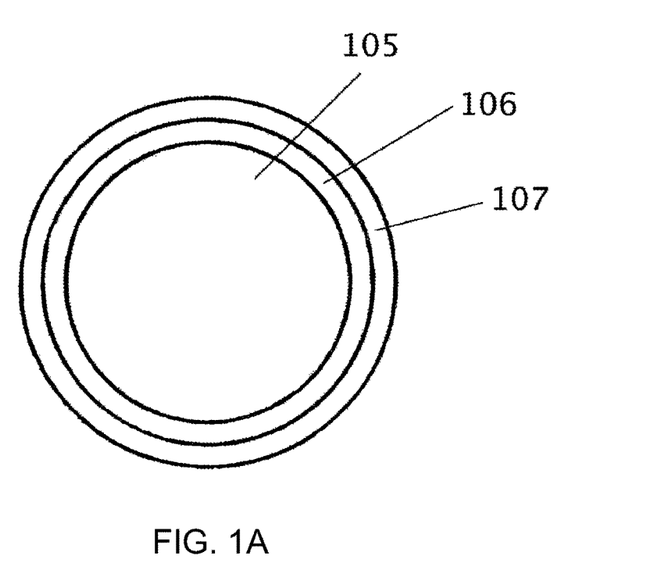
FIG. 1A shows a greatly enlarged cross-sectional view along the line I-I according to FIG. 1.

A steering wheel 1, which has a steering-wheel rim 102, spokes 103 and a hub 104, is illustrated in FIG. 1 as an example for an actuation device of a motor vehicle. The present application is in no way limited to steering wheels however, rather the sensor unit described below can also be applied to other actuation devices, such as gear-change levers and the like, and other devices for which the activity of a user should be monitored.

Figure 2:
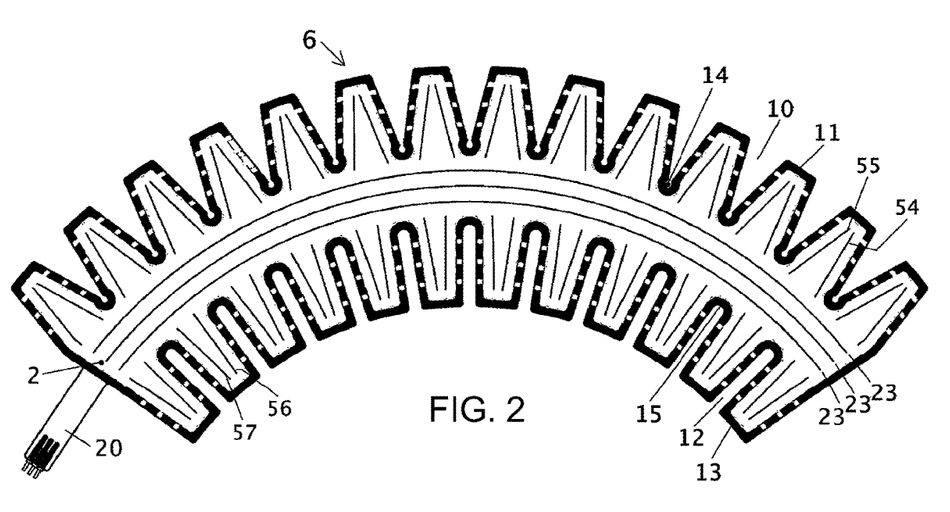
FIG. 2 shows a developed or stretched out view of a part of an embodiment of the sensor unit.

A developed or stretched out view of an embodiment of a flat sensor unit 6 is shown in FIG. 2, which has a central web 2, from which tabs 11, 13 extend on both side edges, which tabs are arranged with respective spacings from one another. The tabs 11, 13 can be arranged along the longitudinal direction of the central web 2 in the manner shown in FIG. 2, offset with respect to one another and/or aligned with one another in order to enable an application in as deformation-free a manner as possible of the sensor unit 6 onto the core of the actuation device.

In order to facilitate the deformation-free application of the sensor unit onto a core, which for example has a circular, oval or similar cross-section, the side edges of the tabs 11, 13 approach one another in a direction away from the central web 2, so that gaps 10, 12, which increase in width, are formed between the tabs, which gaps facilitate an overlap-free application of the tabs 11, 13 onto the core. In addition, the connecting regions of the side edges of mutually adjacent tabs can be formed in the manner shown in FIG. 2 by roundings 14, 15, in order to prevent deformations of the sensor unit 6 in this region.

As an additional measure, it is possible to provide the surface of the core 102 with recesses or depressions, which accommodate a part of the sensor unit 6, which could be deformed during application of the sensor unit onto the core.

The embodiment shown in FIG. 2 is for example suitable for the steering wheel illustrated schematically in FIG. 1, wherein the central web 2 is laid onto a front surface of the rim 102 of a steering wheel, which forms the core 102 of the actuation device, and the tabs are stretched around the steering-wheel rim 102, so that a substantially large-area covering of the steering-wheel rim 102 by the sensor unit 6 results.

In FIG. 2, an embodiment of the sensor unit is shown wherein the central web 2 has a shape which is curved in accordance with the curved front surface of a steering-wheel rim forming the core of the actuation device. According to an other embodiment that is likewise not illustrated, the central web 2 may be rectilinear and laid onto the outer circumference of a steering-wheel rim, whilst the tabs are stretched onto the front and rear edges and the inner circumference of the steering-wheel rim, to achieve a substantially large-area covering of the core.

The same also applies for other cores, which have a two-or three-dimensionally curved surface shape.

In addition thereto, FIG. 2 shows an embodiment of the arrangement of the conducting traces explained in more detail below on the basis of FIG. 3. From FIG. 2, it can already be seen that conducting bus tracks 23 run along the central web 2, which are adapted to be connected via a flexible connecting conduit or trace 20 in the form of a conducting foil trace to a connector. These individual conducting bus traces 23 are connected with the connecting conducting traces shown schematically in FIG. 3 to individual contact areas of the conducting trace pattern on at least one of the foils 31, 32 according to FIGS. 4 and 5, so that by means of a corresponding grouping of the connections between the conducting traces in the individual tabs and the conducting bus traces 23 on the central web, a determination of the position of exertion of force onto one or both of the foils can be ascertained, which leads to contact being made between the contact areas 35, 36 of the conductor-trace patterns 33, 34 shown in FIGS. 4 and 5, both in the tabs 11, 13 and in the region of the central web.

Figure 4:
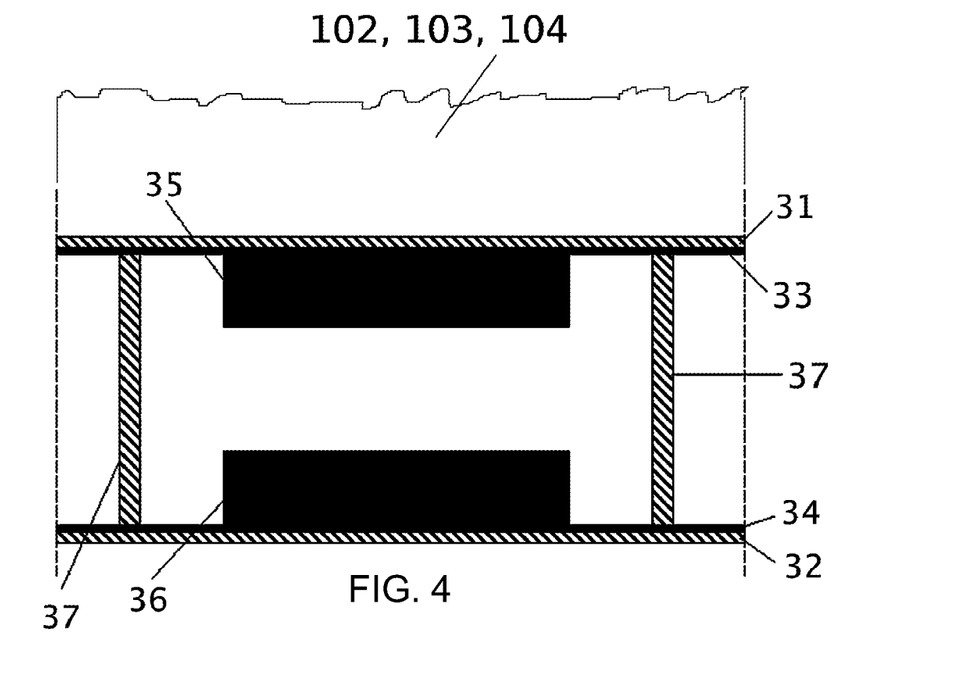
FIG. 4 shows a sectional view along the line IV-IV according to FIG. 3, which shows the arrangement of the conducting traces and spacer elements on the foils in a greatly enlarged illustration and only schematically.
Figure 5:
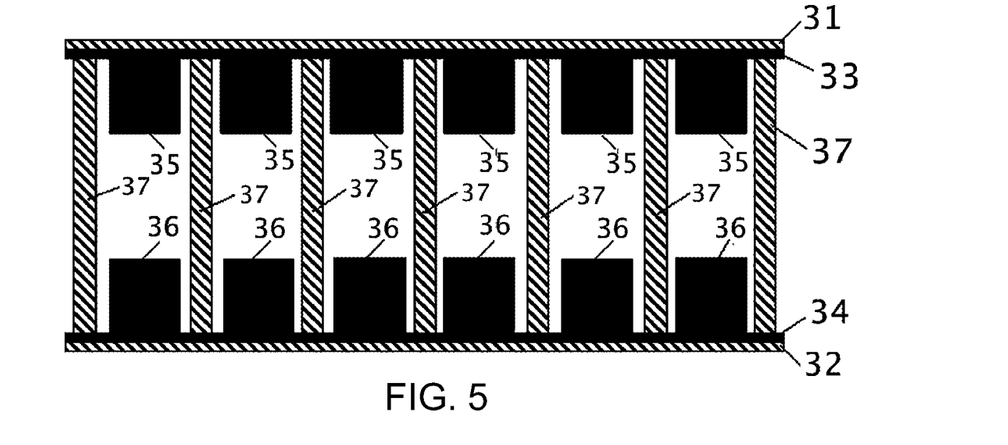
FIG. 5 shows a cross-sectional view essentially corresponding to FIG. 4, but along the line V-V according to FIG. 3.

The FIGS. 4 and 5 show an enlarged partial cross-sectional view of the sensor unit 6, which comprises a first foil 31 adjacent to the respective core 102, 103, 104 of an actuation device and an externally located second foil 32, wherein conducting trace patterns 33, 34, 35, 36 are arranged on the mutually facing surfaces of the two foils 31, 32.

Spacer elements 37 are arranged between the two foils 31, 32, which keep the regions of the conducting trace patterns 33, 34, 35, 36 lying between the spacer elements spaced from one another in the non-actuated state. When force or pressure is exerted onto the outer lying foil 32, the regions of the foil 32 lying between the spacer elements and/or the adjacent spacer elements themselves are deformed, so that a contact between the mutually opposite contact areas 35, 36 of the conducting trace pattern 33, 34, 35, 36 results, which can be detected by the evaluation circuit explained below.

In a first case, the spacer elements 37 can be relatively rigid, whilst the foils 31, 32 are to be constructed with a corresponding elasticity, or the spacer elements 37 can be constructed such that they can be compressed elastically, in order to enable contact to be made, wherein the flexibility of the foils 31, 32 plays a subordinate role. Of course, a combination of both measures is correspondingly possible, in order to enable contact to be made.

The first foil 31 can be placed directly onto the core 102, 103, 104 of the steering-wheel rim illustrated schematically in FIG. 1 or any other actuation element, whilst the second foil 32 is positioned on the outside and is surrounded by an envelope, for example in the case of a steering wheel, by a leather envelope.

As is furthermore illustrated in FIGS. 4 and 5, individual contact areas 35, 36 may be formed if appropriate by means of areas 35, 36 of the conducting traces 33, 34 having a larger thickness, wherein it is however also possible in the case of a correspondingly small spacing of the foils 31, 32, to make use of the conducting traces 33, 34 to make contact without any enlargement of the thickness thereof in the contact areas 35, 36.

Both the conducting traces 33, 34 and the areas 35, 36, which are thickened if appropriate, can be applied onto the foils 31, 32 for example by a printing process, and the same also applies if appropriate for the spacer elements 37. These spacer elements can also be used for connecting the two foils 31, 32 to one another, so that an integrated sensor unit results, which can be stretched and deformed onto the core 102, 103, 104 of the actuation device and subsequently provided with a cover in the form of an envelope.

Figure 3:
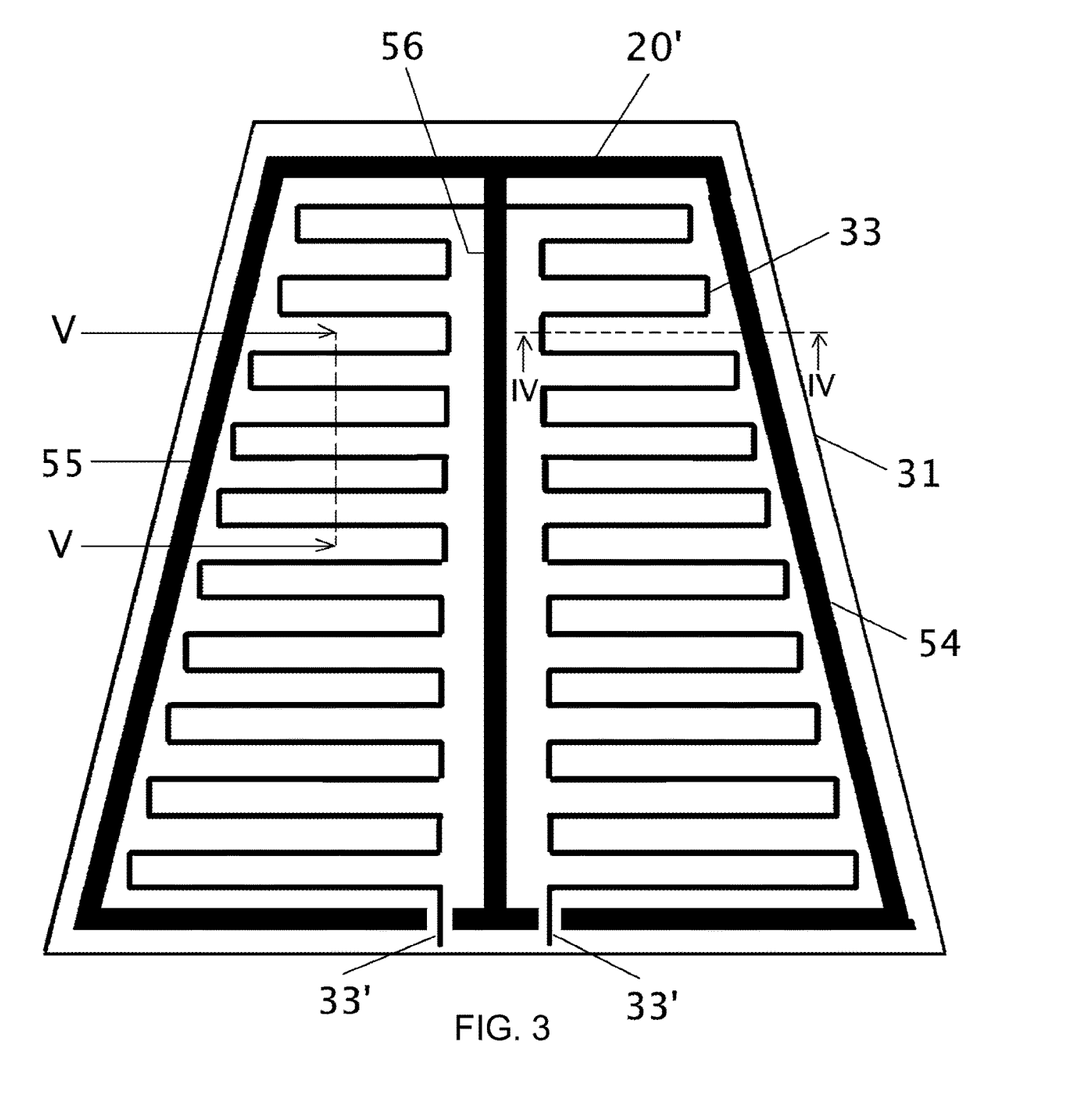
FIG. 3 shows an enlarged partial view of one of the tabs 11, 13 of the sensor unit according to FIG. 2.
Figure 6:
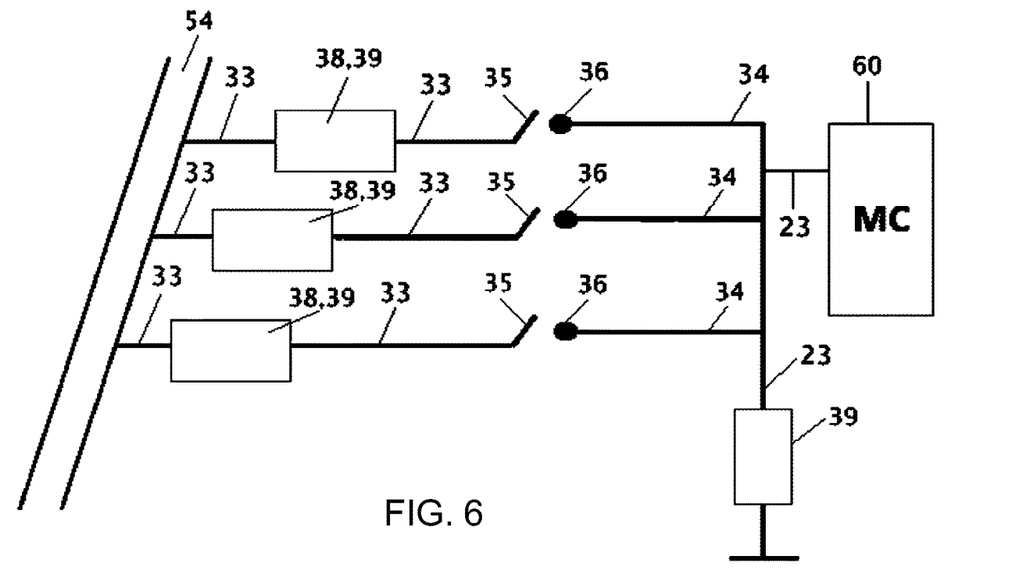
FIG. 6 shows an embodiment of an evaluation circuit for the monitoring unit.

According to a preferred configuration of the invention, the conducting traces 33, 34 are formed from a resistive material, which, in the embodiment illustrated in FIG. 3, are connected via different length sections of the respective connecting conducting traces to the bus traces, so that owing to the resistance variation between the bus conducting traces, the location of an actuation, that is to say making of contact between the conducting traces 33, 34 of the two foils 31, 32 can be detected, as is described in more detail on the basis of FIG. 6.

The conducting trace pattern 33 of one of the tabs 11, 13 of the first foil 31, shown in FIG. 3, only constitutes a conceivable embodiment of a conducting trace pattern, wherein the thickened regions 35, 36 shown in FIGS. 4 and 5 are omitted. Here, outer bus traces 54, 55 are connected at a few points to individual areas of the conducting traces 33 on the tabs and free ends 33', 33" of the conducting traces 33 are connected to the bus traces 23 shown in FIG. 2 on the central web 2, wherein the central web 2 can likewise have a conducting trace pattern corresponding to the conducting traces 33.

An embodiment of an evaluation circuit is shown schematically in FIG. 6, in which a connecting conducting trace 54, 55 and the conducting traces 33 of the first foil 31 are connected to the respective contact areas 35, 36, which form a switch. The conducting traces 33 and/or the connecting conducting traces 54, 55 have a resistance dependent on the length thereof, which is illustrated in the form of resistors 38, 39. The respective other contact of the thus-formed switches 35, 36 is formed by the conducting trace pattern 34 of the second foil 32 and connected via a further one of the bus traces 23 to the input of an evaluation circuit in the form of a microprocessor 60, which is adapted to detect resistance changes between the bus traces, because these occur for example in the embodiment of the evaluation circuit shown in FIG. 6 in the form of changes of the voltage drop at the resistor 39, if the bus traces 54, 55 are connected to a voltage source.

In the same way, the microprocessor 60 may however also be adapted perform a resistance measurement between the bus traces directly, insofar as it has an analogue-to-digital converter at the inputs thereof.

The microprocessor 60 can furthermore be programmed in such a manner that it continuously determines an actual state of the resistance between the bus traces 54, 55, for example as a function of the number of actuated switches 35, 36 and the resistance 38 formed by the connecting conducting traces thereof. In this manner, interfering influences due to creepage currents or contacting occurring continuously because of too great a voltage in the outer envelope of the actuation elements, can be neutralised, whereas an exertion of a force onto a least one of the foils 31, 33 leads to a change of the signal fed to the microprocessor however and can therefore be evaluated.

The conducting trace pattern 34 of the second foil 32 can be constructed in the described exemplary embodiment of the conducting trace pattern 33 of the first foil over a relatively large area or over the full surface and if appropriate without significant resistance properties.

It is furthermore possible to construct the conducting trace pattern 34 of the outer foil 32 as a resistance element of a steering-wheel heater or to provide the area of the second foil facing away from the first foil 31 with corresponding additional conducting traces to form a steering-wheel heater.

The invention claimed is:

1. A monitoring system for motor vehicles, comprising
a number of sensors arranged on control and/or actuation devices of the motor vehicle;
evaluation means for evaluating the output signals of the sensors;
wherein the control and/or actuation devices have a core and an outer envelope covering the core at least to some extent, and
wherein sensor elements are embedded between the core and the outer envelope thereof and are distributed over a substantial portion of an outer surface of the actuation apparatuses and deliver an output signal when a force is exerted onto the outer envelope,
wherein the sensor elements are formed by a pre-assembled sensor unit adapted to be stretched onto the core and covered by the outer envelope,
wherein the sensor unit comprises a first electrically-insulating foil having a first electrically conducting trace pattern printed thereon and a second electrically-insulating foil having a second electrically conducting trace pattern printed thereon and arranged above said first foil, wherein the conducting trace patterns are arranged on the mutually facing surfaces of the first and second foils,
wherein the mutually facing surfaces of the first and second foil are connected to one another by means of spacer elements arranged between the foils, and
wherein printed thereon the foils are elastically biased away from one another and a contact between the first and second conducting trace patterns can be produced on at least one of the foils by exerting a force onto at least one of the foils,
wherein the first and second conducting trace patterns is divided into a plurality of individual areas, and
wherein first groups of individual areas are connected to one another via connecting conducting traces and to the evaluation means by means of conducting bus traces, said connecting conducting traces and bus traces have a measurable resistance, so that a determination of the position of an actuation or force exertion or a change of this actuation can be evaluated by means of a microprocessor as a function of the position and actuation of individual sensors of the sensor unit,
wherein contact areas of the two foils from a switch when actuated,
wherein the spacer elements keep different regions of contact areas lying between the spacer elements spaced from one another in the non-actuated state,
wherein one of the conducting trace patterns being adapted to be connected to a voltage source, while the other of the conducting trace patterns is connected via the conducting bus traces to one or a plurality of inputs of the microprocessor forming part of the evaluation means, which is adapted for measuring the current flowing between the two conducting trace patterns and/or the resistance between these two.

2. The monitoring system according to claim 1, wherein the spacer elements are elastically deformable.

3. The monitoring system according to claim 1, wherein the first and/or second foil is elastically deformable in the region between the spacer elements.

4. The monitoring system according to claim 1, wherein the sensor unit has a central web, and wherein tabs that are spaced from one another by intermediate spaces extend from both longitudinal sides of the central web, conducting trace patterns being provided on both the central web and the tabs.

5. The monitoring system according to claim 4, wherein in the case of a multidimensionally curved surface of the core, the central web of the sensor unit has a shape which follows the shape of one of the lines of curvature of the surface, and wherein the tabs are adapted to be stretched onto the surface in the direction of a second line of curvature, which is oriented substantially orthogonally to the first line of curvature at the point of connection with the central web.

6. The monitoring system according to claim 5, wherein the core is the outer rim of a steering wheel, wherein the first line of curvature corresponds to the front edge of the outer rim and the second line of curvature corresponds to the outer circumference of the cross-section of the outer rim.

7. The monitoring system according to claim 4, wherein in the case of a multidimensionally curved surface of the core, the central web of the sensor unit is rectilinear and can be laid on the outer circumference of the curved surface of the core, which is curved along a first line of curvature, and wherein the tabs are adapted to be stretched onto the surface in the direction of a second line of curvature, which is in each case essentially at right angles to the first line of curvature at the point of connection with the central web.

8. The monitoring system according to claim 7, wherein the core is the outer rim of a steering wheel, wherein the first line of curvature corresponds to the outer circumference of the outer rim and the second line of curvature corresponds to the outer circumference of the cross-section of the outer rim.

9. The monitoring system according to claim 1, wherein the current or resistance measurement is repeated in short time periods and wherein the microprocessor determines a zero state from the respective measured values, wherein deviations from this zero state above a predetermined threshold constitute a trigger criterion for an alarm state.

10. The monitoring system according to claim 1, wherein one of the foils carries a further conducting trace, which is constructed for heating the steering wheel.

* * * * *